(12) United States Patent
Sekimoto et al.

(10) Patent No.: US 8,414,192 B2
(45) Date of Patent: Apr. 9, 2013

(54) CAGE FOR BALL BEARING

(75) Inventors: Hiroshi Sekimoto, Sakurai (JP); Akira Koyama, Kashiwara (JP)

(73) Assignee: JTEKT Corporation, Chuo-Ku, Osaka (JP)

( * ) Notice: Subject to any disclaimer, the term of this patent is extended or adjusted under 35 U.S.C. 154(b) by 1041 days.

(21) Appl. No.: 11/175,389

(22) Filed: Jul. 7, 2005

(65) Prior Publication Data

US 2006/0008192 A1    Jan. 12, 2006

(30) Foreign Application Priority Data

Jul. 8, 2004   (JP) .............................. P 2004-201425

(51) Int. Cl.
*F16C 33/38* (2006.01)
*F16C 33/44* (2006.01)

(52) U.S. Cl.
USPC .......................................... 384/523; 384/527

(58) Field of Classification Search ................. 384/523, 384/526, 527, 528, 533, 534
See application file for complete search history.

(56) References Cited

U.S. PATENT DOCUMENTS

| | | | | |
|---|---|---|---|---|
| 2,550,911 A * | 5/1951 | Cobb ............................ | 384/526 |
| 2,550,912 A * | 5/1951 | Goodwin et al. ............. | 384/526 |
| 2,566,421 A * | 9/1951 | Lapointe ....................... | 384/526 |
| 2,665,958 A * | 1/1954 | Waldherr, Jr. ................. | 384/527 |
| 3,403,951 A * | 10/1968 | Bailey .......................... | 384/528 |
| 5,026,179 A | 6/1991 | Ito | |
| 5,722,780 A * | 3/1998 | Scharman ..................... | 384/531 |
| 6,206,575 B1 * | 3/2001 | Matsushita et al. ........... | 384/523 |
| 6,364,086 B1 * | 4/2002 | Blaurock et al. ......... | 193/35 MD |
| 2004/0028306 A1 * | 2/2004 | Kern et al. .................... | 384/523 |
| 2004/0141670 A1 * | 7/2004 | Gotoh ........................... | 384/523 |
| 2004/0146231 A1 * | 7/2004 | Yakura et al. ................. | 384/477 |
| 2004/0234181 A1 * | 11/2004 | Kobayashi et al. ........... | 384/528 |
| 2004/0252925 A1 * | 12/2004 | Gotoh .......................... | 384/528 |

FOREIGN PATENT DOCUMENTS

| | | |
|---|---|---|
| JP | 2-245516 A | 10/1990 |
| JP | 2000-81041 | 3/2000 |
| JP | 2002-333027 | 11/2002 |
| JP | 2003-120680 | 4/2003 |
| JP | 2003-336640 A | 11/2003 |
| JP | 2004-60775 | 2/2004 |

OTHER PUBLICATIONS

English-language translation of Japanese Office Action dated Aug. 26, 2009.
English-language translation of Japanese Office Action dated May 11, 2009.

* cited by examiner

*Primary Examiner* — Richard W Ridley
*Assistant Examiner* — Daniel Yabut
(74) *Attorney, Agent, or Firm* — McGinn IP Law Group, PLLC (57) ABSTRACT

In the cage, on opposing edges of an outer circumferential opening of each of some of cage pockets, guiding faces for limiting the inward displacement in the radial direction of each of balls for a pitch circle diameter are provided; and on opposing edges of the inner circumferential opening of each of remaining cage pockets, guiding faces for limiting the outward displacement in the radial direction of each of the balls for the pitch circle diameter are provided, thereby making a ball guide.

19 Claims, 5 Drawing Sheets

CAGE FOR BALL BEARING

BACKGROUND OF THE INVENTION

1. Field of the Invention

This invention relates to a cage for a ball bearing serving as a ball guide. This cage is preferably used for, for example, a ball bearing for a revolving seat which supports the rotary segment of a CT scanner.

2. Related Art

For example, in a ball bearing for a revolving seat having a large diameter, where a cage in the same type as a cylindrical cage used for a ball bearing for a general machine tool is adopted (e.g. see JP-A-2004-60775), the thickness of the cage becomes very thin relatively to the diameter thereof. Therefore, the rigidity is lowered so that the cage becomes likely to warp. Where such a cage is used, if the lead/lag of the balls occurs, the region between adjacent cage pockets of the cage may be pulled circumferentially so that the cage is elastically deformed in a straight shape; or otherwise may be contracted so that the cage is elastically deformed in a warped shape. Where such a cage is formed in a race guiding structure guided by a bearing ring member such as an outer ring and inner ring, the elastically deformed portion of the cage is likely to be brought in slidable contact with the bearing ring member. This leads to occurrence of abrasion and noise.

Incidentally, there is a general cylindrical cage circumferentially divided into a plurality of segments. In this case also, the inconvenience as described above occurs. This cage is a cylinder composed of a plurality of plate-like segments which are coupled with one another. At a plurality of positions in a longitudinal direction of each plate-like segment, cage pockets which penetrate through a radial direction are provided (for example, JP-A-2003-120680). There is also a cage in which in the inner and outer circumferential openings of all the cage pockets, lugs having the same shape for stopping the come-off of balls are provided.

SUMMARY OF THE INVENTION

An object of this invention is to provide a cage for a ball bearing which can suppress or prevent its interference for a bearing ring member such as an outer ring or inner ring and so suppress or prevent abrasion or noise.

This invention is a cage of synthetic resin for a ball bearing having cage pockets for ball accommodation which are through holes which penetrate through a radial direction at a plurality of positions of a circumference, characterized in that on opposing edges of an outer circumferential opening of each of some of cage pockets, guiding faces for limiting the inward displacement in the radial direction of each of balls for a pitch circle diameter are provided; and on opposing edges of the inner circumferential opening of each of remaining cage pockets, guiding faces for limiting the outward displacement in the radial direction of each of the balls for the pitch circle diameter are provided, thereby making a ball guide.

In accordance with the cage according to this invention, since allowable inward and outward displacements of the cage are limited while making a ball guide, interference of the cage with a bearing ring member such as an outer ring or an inner ring can be suppressed or prevented. Particularly, where the rigidity of the cage is lowered by for example, making the cage with a large diameter, if the lead/lag of the balls occurs, the circumferential pulling stress or contractive stress acts on the cage so that the cage is likely to be elastically deformed inward or outward in the radial direction. Where the pulling stress circumferentially acts on the cage, the outer circumferential faces of the cage interfere with the ball so that the inward elastic deformation in the radial direction of the cage is suppressed. Where the contractive stress circumferentially acts on the cage, the inner circumferential faces of the cage interfere with the ball so that the outward elastic deformation in the radial direction of the cage is suppressed. Thus, the interference of the cage with the bearing ring member such as the outer ring or inner ring is suppressed or prevented.

Preferably, the circumference is separated at a single position so that a securing portion at its one separating end and an engaging portion at its other separating end can be coupled with or separated from each other. Further, preferably, the cage is formed in a cylindrical shape composed of a plurality of plate-like segments each arch-shaped when viewed from side.

Preferably, stoppers for stopping the come-off of the balls are provided at the inner circumferential opening of each of some of cage pockets with the guiding faces provided on the outer circumferential opening, and at the outer circumferential opening of each of the remaining cage pockets with the guiding faces provided on the inner circumferential opening. In accordance with this configuration, since the balls can be held non-separately in the cage pockets, the cage can be easily handled.

Preferably, the outer circumferential guiding faces and the inner circumferential guiding faces are alternately provided at every predetermined number of cage pockets along the circumference. This configuration is useful to prevent the interference of the cage with the bearing ring member such as the outer ring or inner ring.

According to another aspect of the invention, there is provided a cage for ball bearing, comprising:
an annular cage body having at least one first cage pocket and at least one second cage pocket, each of which is formed as a through hole for accommodating a ball, arranging along a circumferential direction of the cage body;
a first guiding convex having a guiding face oriented radially inward of the cage body formed on an outer circumferential opening of the first guiding convex; and
a second guiding convex having a guiding face oriented radially outward of the cage body formed on an inner circumferential opening of the second guiding convex.

A pair of the first guiding convexes may be opposed to each other on the outer circumferential opening of the first cage pocket, so that the first cage pocket is narrowed radially outward of the cage body. Similarly, a pair of the second guiding convexes may be opposed to each other on the inner circumferential opening of the second cage pocket, so that the second cage pocket is narrowed radially inward of the cage body.

In at least one of the first guiding convex and the second guiding convex, the guiding face may include a planar face at a center part in an axial direction of the cage body and partial conical faces on both sides of the center part.

In at least one of an inner circumferential opening of the first cage pocket and an outer circumferential opening of the second cage pocket, a ball stopper may be provided.

A plurality the first cage pocket and a plurality of the second cage pocket may be alternately provided at every predetermined number of cage pockets along the circumference. More specifically, the first cage pocket and the second cage pocket are alternately provided along the circumference.

In an exemplary embodiment of the claimed invention the outer circumferential guiding convexes and the outer circumferential stoppers which are adjacent each other in the circumferential direction protrude from an outer circumferential surface of the curved segments independently. The inner circumferential guiding convexes and the inner circumferential stoppers which are adjacent each other in the circumferential direction protrude from an inner circumferential surface of the curved segments independently. A length in the circumferential direction of the outer circumferential guiding convex is longer than that of the outer circumferential stopper, a maximum height in the radial direction from the outer circumferential surface of the curved segment of the outer circumferential guiding convex is higher than that of the outer circumferential stopper, and an axial length of the outer circumferential guiding convex is longer than that of the outer circumferential stopper. A length in the circumferential direction of the inner circumferential guiding convex is longer than that of the inner circumferential stopper, a maximum height in the radial direction from the inner circumferential surface of the curved segment of the inner circumferential guiding convex is higher than that of the inner circumferential stopper, and an axial length of the inner circumferential guiding convex is longer than that of the inner circumferential stopper. A segment of the outer circumferential surface of the curved segment between the outer circumferential guiding convexes and the outer circumferential stoppers which are adjacent each other in the circumferential direction does not overlap a segment of the inner circumferential surface of the curved segment between the inner circumferential guiding convexes and the inner circumferential stoppers which are adjacent each other, in the circumferential direction of the cage.

In an exemplary embodiment of the claimed invention, the outer circumferential guiding convex, except for a part of the outer circumferential guiding convex facing the pocket, is surrounded by the outer circumferential surface of the curved segment. The outer circumferential stopper, except for a part of the outer circumferential stopper facing the pocket, is surrounded by the outer circumferential surface of the curved segment. The outer circumferential guiding convex, except for a part of the inner circumferential guiding convex facing the pocket, is surrounded by the inner circumferential surface of the curved segment, and the inner circumferential stopper, except for a part of the inner circumferential stopper facing the pocket, is surrounded by the inner circumferential surface of the curved segment.

A ball bearing may be provided with a cage according to the invention, a plurality of balls, an outer ring and an inner ring.

In accordance with the cage for a ball bearing according to this invention, the cage can be made difficult to interfere with the bearing ring member, thereby preventing or suppressing occurrence of abrasion or noise. This contributes to reduction of bearing torque.

DETAILED DESCRIPTION OF THE PREFERRED EMBODIMENTS

Now referring to the drawings, an explanation will be given of the best mode of this invention.

First, referring to FIG. 9, an explanation will be given of the ball bearing using the cage according to this invention. It is assumed that the ball bearing is a slant-contact ball bearing. The ball bearing includes an outer ring 2, an inner ring 3, a plurality of balls 4 and a cage 5. Between the outer ring 2 and inner ring 3 which are opposite, lubricant such as grease is inserted.

Figure 1:
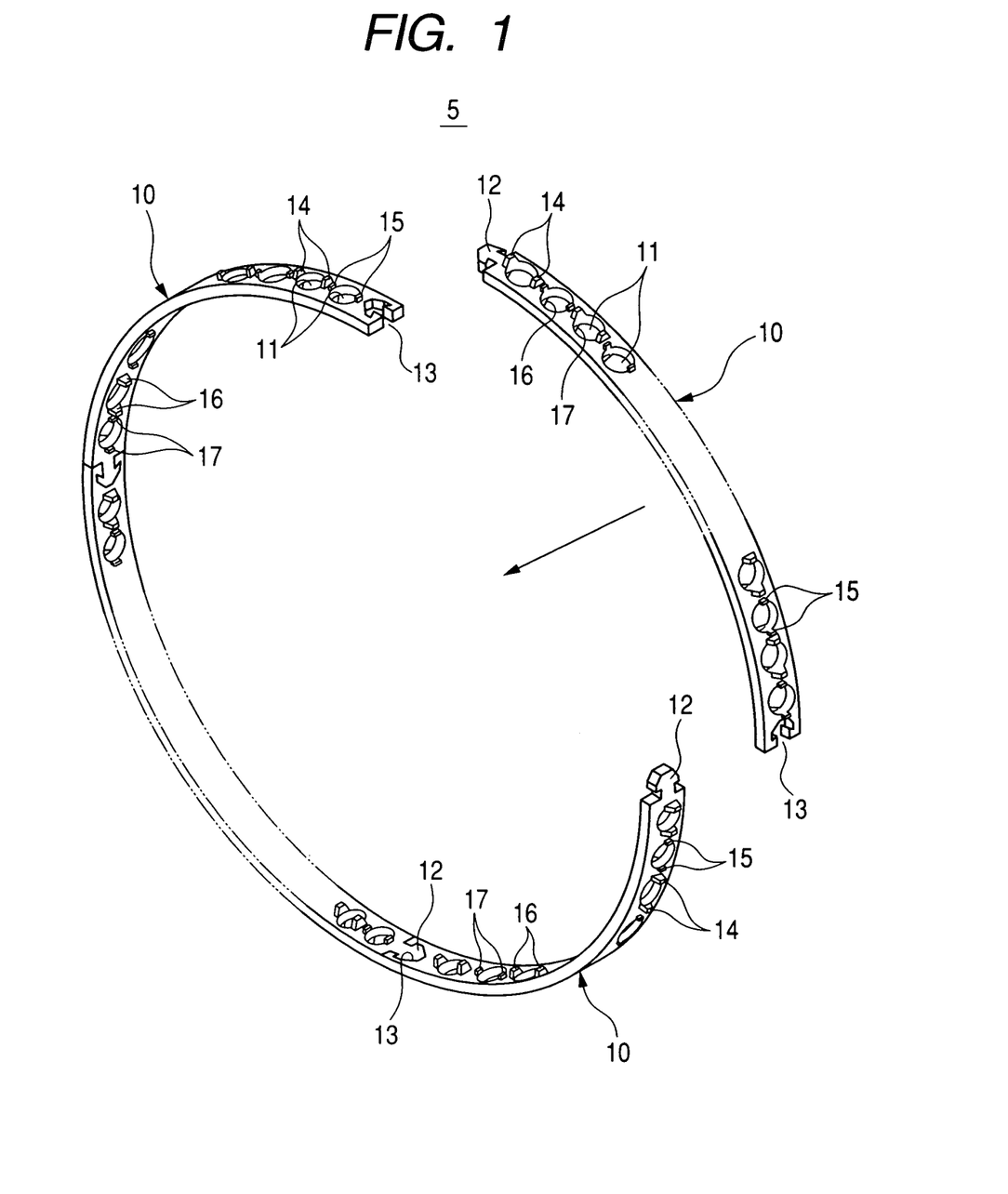
FIG. 1 is an exploded perspective view showing the best mode of the cage for a ball bearing according to this invention.
Figure 2:
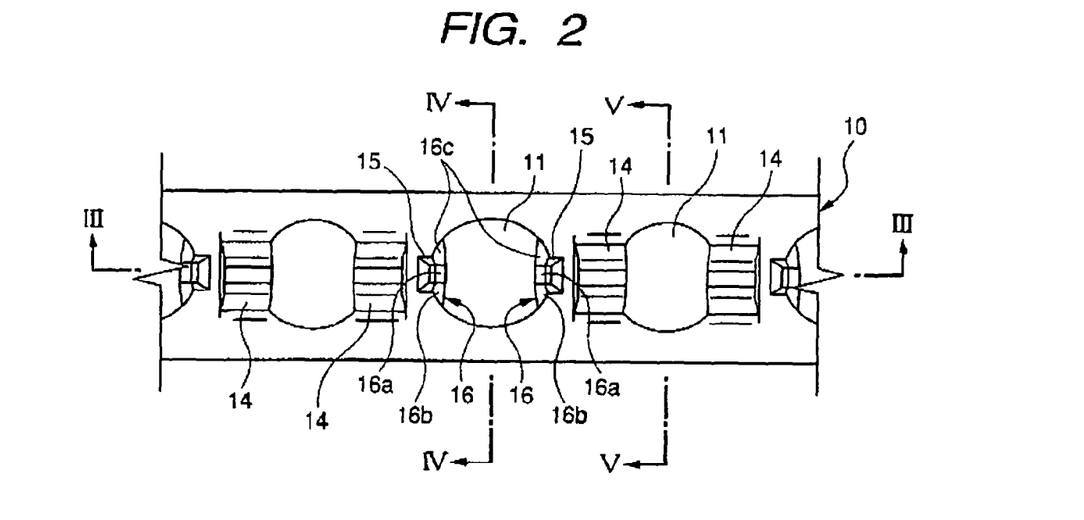
FIG. 2 is a planar developed view of the cage shown in FIG. 1.
Figure 3:
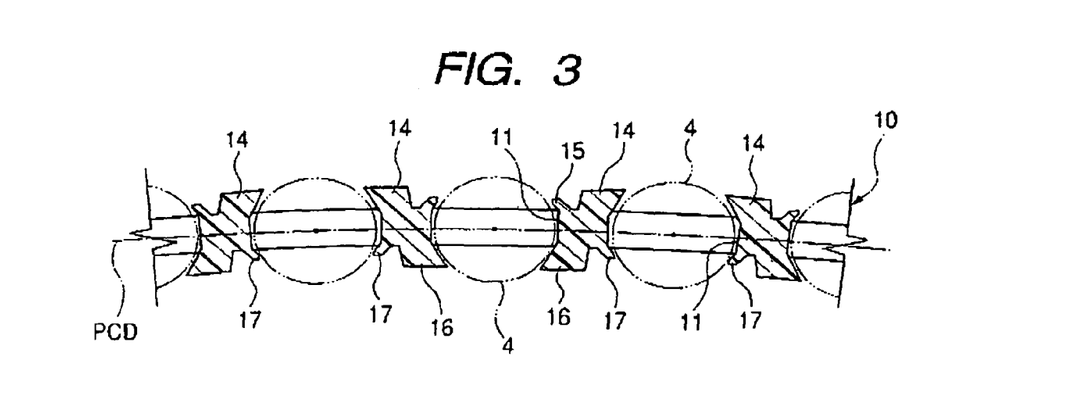
FIG. 3 is a view taken by an arrow of line III-III in FIG. 2.
Figure 4:
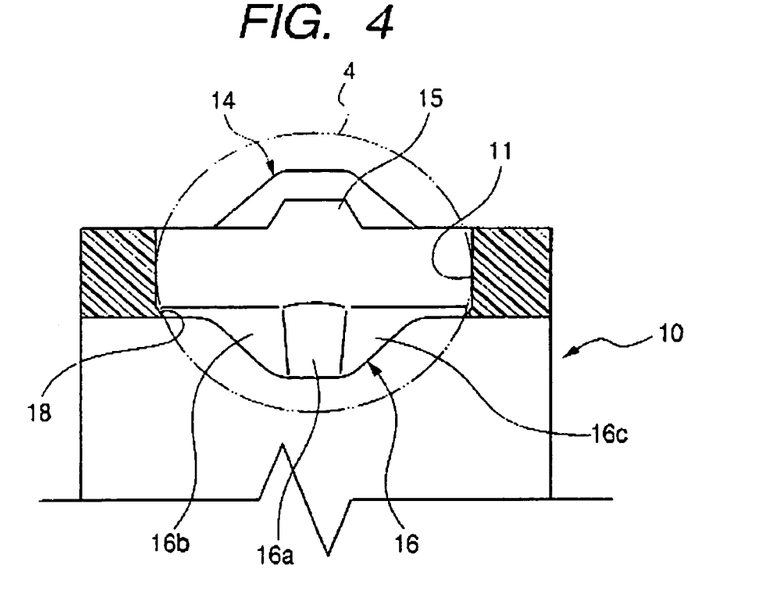
FIG. 4 is a view taken by an arrow of line IV-IV in FIG. 2.
Figure 5:
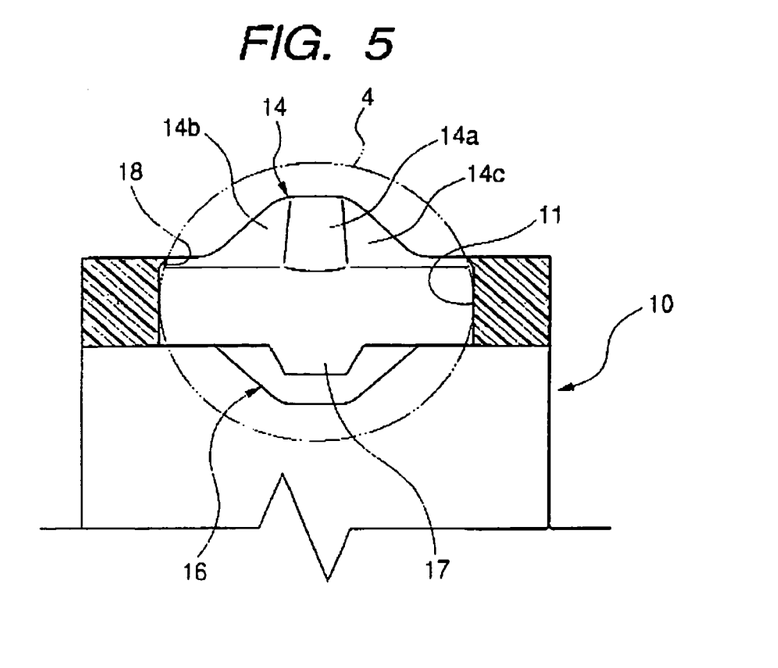
FIG. 5 is a view taken by an arrow of line V-V in FIG. 2.
Figure 6:
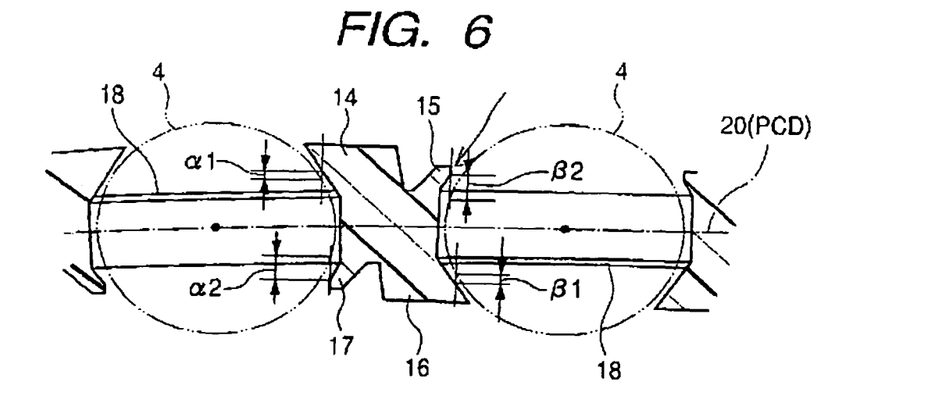
FIG. 6 is a partially enlarged view of FIG. 3.

Referring to FIGS. 1 to 6, the cage 5 will be explained in detail. FIG. 1 is an exploded perspective view showing the best mode of the cage for a ball bearing according to this invention. FIG. 2 is a planar developed view of the cage. FIG. 3 is a view taken by an arrow of line III-III in FIG. 2. FIG. 4 is a view taken by an arrow of line IV-IV in FIG. 2. FIG. 5 is a view taken by an arrow of line V-V in FIG. 2. FIG. 6 is a partially enlarged view of FIG. 3.

The cage 5 (or cage body) is formed in an annular shape and cylindrical shape by circumferentially coupling a plurality of plate-like segments 10, . . . . Although not shown, this cage 5 is in a state where these segments are not coupled at a single position of the circumference but separated. This permits a change in the length of the circumference due to a moisture absorbance function of each plate-like segment 10 to be dealt with.

The plate-like segment 10 is formed in a belt shape in a plan view, and in a curved shape like an arch in a side view.

The plate-like segment 10 is preferably made of e.g. polyamide 66. However, it may be made of synthetic resin such as polyamide, polyethylene, polyacetal, polyethylene terephthalate, polybutylene terephthalate, polycarbonate, polyphenylene sulfide, polyether sulfone, polyetherimide, polyamideimide, polyether etherketone, thermoplastic imide, thermosetting imide, epoxy resin and phenol resin.

More specifically, at a plurality of positions in a longitudinal direction of the plate-like segment 10, cage pockets 11, . . . are formed for accommodating balls, respectively. At positions of both ends in the longitudinal direction of the plate-like segment 10, a securing portion 12 for coupling and an engaging portion 13 for coupling are separately provided.

The cage pocket 11 is a cylindrical through hole which penetrates in a thickness direction of the plate-like segment 10.

The securing portion 12 is formed in a convex shape, and the engaging portion 13 is formed in a concave shape. The securing portion 12 and the engaging portion are mated to be fit to each other. In order to eliminate the backlash between the securing portion 12 and the engaging portion 13, they may be forcibly fit by plugging the gap therebetween. But they may be fit in a state with slight looseness.

In the outer circumferential openings of each of cage pockets 11 arranged in the longitudinal direction of the plate-like segment 10, a pair of guiding convexes 14 and a pair of stoppers 15 are alternately provided. In the inner circumferential openings of each of cage pockets 11 arranged in the longitudinal direction of the plate-like segment 10, a pair of stoppers 17 and a pair of guiding convexes 16 are alternately provided. Thus, in the outer circumferential openings and the inner circumferential openings of each of the odd cage pockets 11 (corresponding to first cage pocket) from the one end (where the securing portion 12 is located) in the longitudinal direction of the plate-like segment 10, the pair of guiding convexes 14 and the pair of stoppers 17 are arranged respectively. In the outer circumferential openings and the inner circumferential edges of each of the even cage pockets 11 (corresponding to second cage pocket) from the one end in the longitudinal direction of the plate-like segment 10, the pair of stoppers 15 and the pair of guiding convexes 16 are arranged respectively.

Concretely, among all the cage pockets 11 of the plate-like segment 10, at intermediate two positions in the axial direction in the outer circumferential openings of each of the odd cage pockets 11 from the one end (where the securing portion 12 is located) in the longitudinal direction,
the pair of guiding convexes 14 which protrude outward in the radial direction are provided; and at intermediate two positions in the axial direction in the outer circumferential openings of each of the even cage pockets 11 from the one end in the longitudinal direction, the pair of stoppers 15 which protrude outward in the radial direction are provided. The outer circumferential guiding convex 14 is formed in a trapezoidal shape which becomes narrow outward in the radial direction and the stopper 15 is formed in a relatively small lug shape. Further, at intermediate two positions in the axial direction in the inner circumferential openings of each of the odd cage pockets 11 from the one end in the longitudinal direction, the pair of stoppers 17 which protrude inward in the radial direction are provided; and at intermediate two positions in the axial direction in the inner circumferential openings of each of the even cage pockets 11 from the one end in the longitudinal direction, the pair of guiding convexes 16 which protrude inward in the radial direction are provided. The inner circumferential guiding convex 16 is formed in a trapezoidal shape which becomes narrow outward in the radial direction and the stopper 17 is formed in a relatively small lug shape.

Incidentally, the opposite inner faces of the pair of outer circumferential guiding convexes 14 are used as guiding faces for limiting the inward displacement from the pitch circuit diameter PCD of each ball 4 to be less than a predetermined allowable inward displacement Δ1 in the radial direction. The opposite inner faces of the pair of inner circumferential guiding convexes 16 are used as guiding faces for limiting the outward displacement from the pitch circuit diameter PCD of each ball 4 to be less than a predetermined Δ2 in the radial direction.

The guiding face of the outer circumferential guiding convex 14 includes, as shown in FIG. 5, a planar face 14a at the center in the width direction (axial direction of the cage 5) of the plate-like segment 10 and partial conical faces 14b, 14c on both sides thereof. The guiding face of the inner circumferential guiding convex 16 includes, as shown in FIG. 4, a planar face 16a at the center in the width direction of the plate-like segment 10 and partial conical faces 16b, 16c on both sides thereof. Thus, in each cage pocket 11, the interval between the pair of opposite outer circumferential guiding convexes 14 becomes gradually narrow-outward in the radial direction of the cage 5. The interval between the pair of opposite inner circumferential guiding convexes 16 becomes gradually narrow inward in the radial direction. This configuration serves to stop the come-off of the ball 4. Further, on each of the guiding faces, the ball 4 is in point-contact with the planar faces 14a, 16a and partial conical faces 14b, 14c, 16b, 16c. Thus, the lubricant applied to the ball 4 is difficult to be scraped off so that the function of lubricant can be kept stably.

Further, in each cage pocket 11, corresponding to the outer circumferential and inner circumferential guiding convexes 14, 16, the interval between the pair of opposite outer circumferential stoppers 15 becomes gradually narrow outward in the radial direction of the cage 5. The interval between the pair of opposite inner circumferential stoppers 17 becomes gradually narrow inward in the radial direction. This configuration serves to stop the come-off of the ball 4.

Incidentally, as shown in FIGS. 4 and 5, slight slopes 18 for narrowing the opening are provided at the outer circumferential opening edges of the cage pocket 11 where the outer circumferential guiding convexes 14 are provided and at the inner circumferential opening edges of the cage pocket 11 where the inner circumferential guiding convexes 16 are provided. These slight slopes 18 contribute to stop the come-off of the ball 4 and suppress inclination of the cage 4 for the ball 4.

Further, in each of the plate-like segments 10, the lubricant such as grease collects between the outer circumferential guiding convex 14 and the stopper 15 adjacent thereto in the longitudinal direction in each of the plate-like segments 10 and between the inner circumferential guiding convex 16 and the stopper 17 adjacent thereto in the longitudinal direction. The slopes 18, 18 facilitate supply of the collected lubricant into the packet 11, thereby contributing to improve the lubrication of the contact position between the ball 4 and cage 5.

Figure 7:
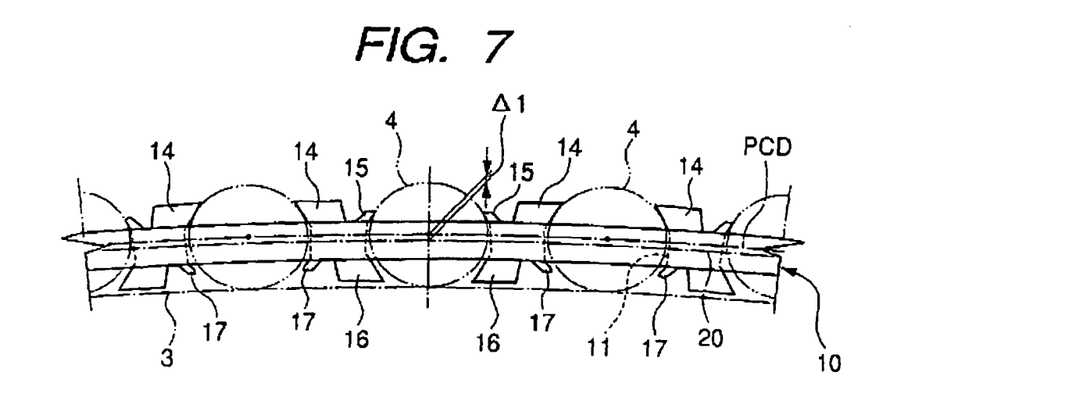
FIG. 7 is a view for explaining the cage displaced downward when viewed from side.
Figure 8:
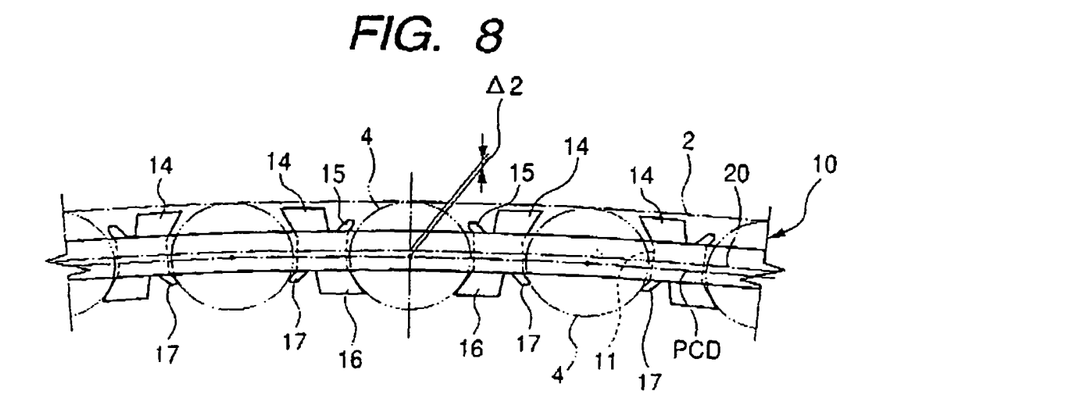
FIG. 8 is a view for explaining the cage displaced upward when viewed from side.

Referring to FIGS. 6 to 8, an explanation will be given of the allowable displacements Δ1, Δ2 in the radial inward and outward directions of the cage 5.

In a state where a virtual circle 20 at the center in the radial direction (thickness direction) of the cage 5 and the pitch circuit diameter PCD of each ball 4 are made coincident, with respect to each of the odd cage pockets 11 from the one end (securing portion 12 is provided) in the longitudinal direction of the plate-like segment 10, a radial gap α1 is provided between the halfway position in the radial direction of the outer circumferential guiding convex 14 and the ball 4; and a radial gap α2 is provided between the end edge of the inner circumferential stopper 17 and the ball 4. On the other hand, with respect to each of the even cage pockets 11 from the one end (securing portion 12 is provided) in the longitudinal direction of the plate-like segment 10, a radial gap β1 is provided between the halfway position in the radial direction of the inner circumferential guiding convex 14 and the ball 4; and a radial gap β2 is provided between the end edge of the outer circumferential stopper 15 and the ball 4.

Incidentally, the radial gaps α1 and β1 are set at approximately equal values and the radial gaps α2 and β2 are set at approximately equal values. By setting the radial gaps α1 and β1 at smaller values than the radial gaps α2 and β2, the radial gap α1 on the outer circumferential side serves as the allowable inward displacement Δ1 in the radial direction whereas the radial gap β1 on the inner circumferential side serves as the outward allowable displacement Δ2 in the radial direction. If these gaps α1 and β1 in the radial direction are made small, the inward and outward allowable displacements Δ1 and Δ2 in the radial direction of the cage 5 can be set at a small value.

As can be seen in FIG. 6, stopper 17 includes a surface 21 facing the pocket which projects toward the pocket when the surface goes to a radial inner side and, and a chamfered flat surface 22 that is apart from a surface of the ball in the pocket and is located on the radial inner side of the surface facing the pocket. Similarly stopper 15 includes a surface 23 facing the pocket which projects toward the pocket when the surface goes to a radial outer side, and a chamfered flat surface 24 that is apart from a surface of the ball in the pocket and is located on the radial outer side of the surface facing the pocket.

Figure 9:
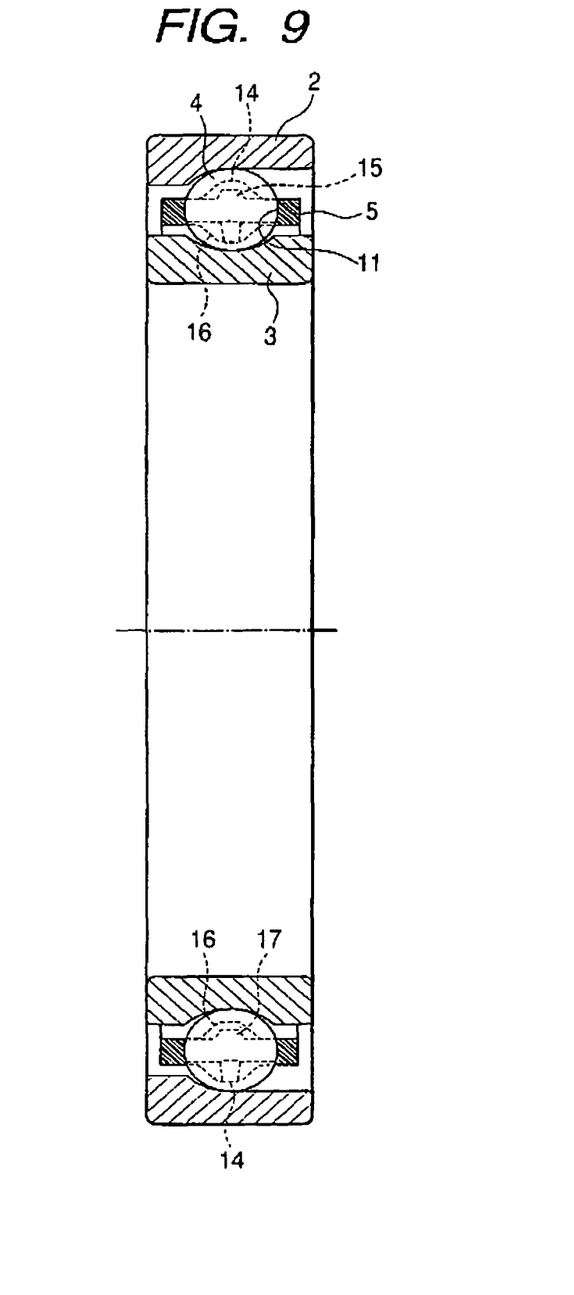
FIG. 9 is a sectional view of a ball bearing for a revolving seat using the cage according to this invention.

If the cage 5 having the configuration described above is build in a slant-contact ball bearing as shown in FIG. 9, in their non-contact state, the outer circumferential guiding convex 14 is inserted within the raceway groove of the outer ring 2 and the inner circumferential guiding convex 16 is inserted within the raceway groove of the inner ring 3. The opposite interval between the raceway groove of the outer ring 2 and the outer circumferential guiding convex 14 and the opposite interval between the outer periphery of the circle body of the cage 5 and the inner periphery of both shoulders of the outer ring 2 are set at larger values than the outward allowable displacement Δ1 in the radial direction of the cage 5. The opposite interval between the raceway groove of the inner ring 3 and the inner circumferential guiding convex 16 and the opposite interval between the inner periphery of the circle body of the cage 5 and the outer periphery of both shoulders of the inner ring 3 are set at a larger values than the outward allowable displacement Δ2 in the radial direction of the cage 5.

Referring to FIGS. 7 and 8, the operation of the cage 5 will be explained. FIG. 7 is a view for explaining the cage displaced downward when viewed from side. FIG. 8 is a view for explaining the cage displaced upward when viewed from side.

As shown in FIG. 9, when the cage 5 build in the ball bearing is rotated, the balls 4 revolve on both on their axis and around their raceway so that the cage 5 is rotatively guided by the balls 4. In this case, the lead/lag of the balls 4 occurs, the circumferential pulling stress or contractive stress are generated at the region between the adjacent cage pockets 11 of the cage 5. As a result, the cage 5 will be elastically deformed inward and outward in the radial direction. Particularly, if the rigidity of the cage 5 is lowered by for example, making the cage with a large diameter, the elastic deformation is increased.

However, as described above, since the cage 5 is ball-guided and the inward and outward allowable displacements Δ1 and Δ2 in the radial direction of the cage 5, when the pulling stress circumferentially acts on the cage 5, are limited the guiding faces (14a to 14c) of the outer circumferential guiding convexes 14 of the cage 5 interfere with the balls 4, the inward elastic deformation in the radial direction of the cage 5 is suppressed. When the contractive stress circumferentially acts on the cage 5, the guiding faces (16a to 16c) of the inner circumferential guiding convexes 16 of the cage 5 interfere with the balls 4, the outward elastic deformation in the radial direction of the cage 5 is suppressed. Thus, it is possible to suppress or prevent the interference of the cage 5 with the outer ring 2 and inner ring 3. In addition, the ball 4 is kept in point-contact with the guiding faces (14a to 14c, 16a to 16c), the lubricant applied to the ball 4 is difficult to be scraped off. Thus, the abrasion of the cage 5 can be suppressed or prevented and also the occurrence of noise can be suppressed or prevented.

An explanation will be given of other embodiments of this invention.

(1) In the above embodiment, the guiding convexes 14, 16 and stoppers 15, 17 were provided in every other cage pocket in the longitudinal direction of the plurality of cage pockets 11, but they may be suitably arranged such as in every third cage pocket, fourth cage pocket, etc.

Moreover, the guiding convexes 14, 16 are not necessarily provided for all the cage pockets 11. Certain cage pocket 11 may be provided only with stoppers 15,17.

(2) In the embodiment described above, the cage 5 was formed in a cylindrical shape composed of a plurality of plate-like segments 10. Although not shown, the circumference may be separated at only a single position. Namely, this invention may be applied to the cage in which the one separating end and the other separating end can be coupled with or separated from each other. Further, this invention can be applied to the cage in a cylindrical shape not separated over the circumference.

(3) In the embodiment described above, the cage 5 according to this invention was employed for the slant-contact ball bearing, but may be used for other ball bearings, e.g. a deep-groove ball bearing. In short, the cage 5 according to this invention suffices to may be cylindrical, and the type of the bearing for which the cage 5 is used should not be limited. For example, the cage 5 according to this invention can be used for the ball bearing for a revolving seat which supports the rotating portion of a CT scanner. In this case, the diameter of the cage 5 is increased so that the rigidity of the entire cage 5 is lowered. However, as long as the cage 5 according to this invention is used, the interference of the cage 5 with the bearing ring member such as the outer ring or inner ring can be suppressed or prevented. Thus, the abrasion resistance and silence of the cage can be improved.

Although the invention has been described in its preferred form with a certain degree of particularity, obviously many changes and variations are possible therein. It is therefore to be understood that the present invention may be practiced than as specifically described herein without departing from the scope and the spirit thereof.

What is claimed is:

1. A cage for a ball bearing, comprising:
 a synthetic resin in which cage pockets for accommodating balls, respectively, formed as through holes penetrating through a radial direction are arranged on a circumference of said cage, and being formed by connecting a plurality of curved segments each of which comprises a curved shape in a circumferential direction;
 a pair of outer circumferential guiding convexes which protrude outwardly in the radial direction from the curved segments are provided on opposing edges of outer circumferential openings of certain cage pockets, and outer circumferential guiding faces for limiting radially inward displacement of the curved segments with respect to a pitch circle diameter of said balls are provided on said pair of outer circumferential guiding convexes; and
 a pair of inner circumferential guiding convexes which protrude inwardly in the radial direction from the curved segments are provided on opposing edges of inner circumferential openings of other cage pockets, and inner circumferential guiding faces for limiting a radially outward displacement of the curved segments with respect to the pitch circle diameter of said balls are provided on said pair of inner circumferential guiding convexes,
 wherein the outer circumferential guiding faces of said certain cage pockets and the inner circumferential guiding faces of said other cage pockets are alternately provided on each adjacent pair of said cage pockets along the circumference,
 wherein a pair of opposite inner circumferential stoppers for stopping come-off of said balls are provided on opposing sides in a circumferential direction in an inner circumferential opening of each of said certain cage pockets which has the outer circumferential guiding faces on the outer circumferential opening, and an interval between said pair of opposite inner circumferential stoppers becomes gradually narrow inwardly in the radial direction of the cage to stop come-off of the ball toward an inner circumferential side, said opposite inner circumferential stoppers including a surface facing the pocket and a surface opposite to the pocket in the circumferential direction both of which approach the pocket in the circumferential direction as the surface facing the pocket and the surface opposite to the pocket project inwardly in the radial direction from the curved segments, a surface facing the pocket in each of the opposite inner circumferential stoppers projects toward the pocket when the surface goes to a radial inner side, and a chamfered flat surface that is apart from a surface of the ball in the pocket is located on the radial inner side of the surface facing the pocket, wherein a pair of opposite outer circumferential stoppers for stopping come-off of said balls are provided on opposing sides in the circumferential direction in an outer circumferential opening of each of the other cage pockets which has the inner circumferential guiding faces on the inner circumferential opening, and an interval between the pair of opposite outer circumferential stoppers becomes gradually narrow outwardly in the radial direction of the cage to stop come-off of the ball toward an outer circumferential side, said opposite outer circumferential stoppers having a surface facing the pocket and a surface opposite to the pocket in the circumferential direction both of which approach the pocket in the circumferential direction as the surface facing the pocket and the surface opposite to the pocket project outwardly in the radial direction from the curved segments, a surface facing the pocket in each of the opposite outer circumferential stoppers projects toward the pocket when the surface goes to a radial outer side, and a chamfered flat surface that is apart from a surface of the ball in the pocket is located on the radial outer side of the surface facing the pocket, wherein the outer circumferential guiding convexes and the outer circumferential stoppers which are adjacent each other in the circumferential direction protrude from an outer circumferential surface of the curved segments independently, wherein the inner circumferential guiding convexes and the inner circumferential stoppers which are adjacent each other in the circumferential direction protrude from an inner circumferential surface of the curved segments independently;

wherein a length in the circumferential direction of the outer circumferential guiding convex is longer than that of the outer circumferential stopper, a maximum height in the radial direction from the outer circumferential surface of the curved segment of the outer circumferential guiding convex is higher than that of the outer circumferential stopper, and an axial length of the outer circumferential guiding convex is longer than that of the outer circumferential stopper, wherein a length in the circumferential direction of the inner circumferential guiding convex is longer than that of the inner circumferential stopper, a maximum height in the radial direction from the inner circumferential surface of the curved segment of the inner circumferential guiding convex is higher than that of the inner circumferential stopper, and an axial length of the inner circumferential guiding convex is longer than that of the inner circumferential stopper, and wherein a segment of the outer circumferential surface of the curved segment between the outer circumferential guiding convexes and the outer circumferential stoppers which are adjacent each other in the circumferential direction does not overlap a segment of the inner circumferential surface of the curved segment between the inner circumferential guiding convexes and the inner circumferential stoppers which are adjacent each other, in the circumferential direction of the cage.

2. A cage for a ball bearing according to claim 1, wherein a circumference of said cage is separated at one position such that a securing portion at one end of said cage and an engaging portion at another end of said cage are engageable and detachable with respect to each other.

3. A cage for a ball bearing according to claim 1, wherein said outer circumferential guiding face includes a planar face at a center part in an axial direction of said cage body and partial conical faces on both axial sides of said center part, and wherein said inner circumferential guiding face includes a planar face at a center part in an axial direction of said cage body and partial conical faces on both axial sides of said center part.

4. A cage for a ball bearing according to claim 1, wherein each of the cage pockets for accommodating balls is a cylindrical through hole.

5. A ball bearing comprising the cage according to claim 1, further comprising a plurality of balls, an outer ring and an inner ring.

6. A cage for a ball bearing according to claim 1, wherein the outer circumferential guiding faces are only provided on said certain cage pockets and the inner circumferential guiding faces are only provided on said other cage pockets.

7. A cage for a ball bearing according to claim 3, wherein a slope narrowing the plurality of outer circumferential openings is provided on a plurality of edges of the outer circumferential openings on which the outer circumferential guiding faces are provided, adjacent to the outer circumferential guiding faces in the circumferential direction, in said plurality of cage pockets.

8. A cage for a ball bearing, comprising:
a synthetic resin in which cage pockets for accommodating balls, respectively, formed as through holes penetrating through a radial direction are arranged on a circumference of said cage, and being formed by connecting a plurality of curved segments each of which comprises a curved shape in a circumferential direction;
a pair of outer circumferential guiding convexes which protrude outwardly in the radial direction from the curved segments are provided on opposing edges of outer circumferential openings of certain cage pockets, and outer circumferential guiding faces for limiting radially inward displacement of the curved segments with respect to a pitch circle diameter of said balls are provided on said pair of outer circumferential guiding convexes; and
a pair of inner circumferential guiding convexes which protrude inwardly in the radial direction from the curved segments are provided on opposing edges of inner circumferential openings of other cage pockets, and inner circumferential guiding faces for limiting a radially outward displacement of the curved segments with respect to the pitch circle diameter of said balls are provided on said pair of inner circumferential guiding convexes, whereby a ball guide is formed so as to suppress or prevent interference of the cage with a bearing ring member, wherein the outer circumferential guiding faces of said certain cage pockets and the inner circumferential guiding faces of said other cage pockets are alternately provided on each adjacent pair of said cage pockets along the circumference, wherein a pair of opposite inner circumferential stoppers for stopping come-off of said balls are provided on opposing sides in a circumferential direction in an inner circumferential opening of each of said certain cage pockets which has the outer circumferential guiding faces on the outer circumferential opening, and an interval between said pair of opposite inner circumferential stoppers becomes gradually narrow inwardly in the radial direction of the cage to stop come-off of the ball toward an inner circumferential side, said opposite inner circumferential stoppers including a surface facing the pocket and a surface opposite to the pocket in the circumferential direction both of which approach the pocket in the circumferential direction as the surface facing the pocket and the surface opposite to the pocket project inwardly in the radial direction from the curved segments, a surface facing the pocket in each of the opposite inner circumferential stoppers projects toward the pocket when the surface goes to a radial inner side, and a chamfered flat surface that is apart from a surface of the ball in the pocket is located on the radial inner side of the surface facing the pocket, wherein a pair of opposite outer circumferential stoppers for stopping come-off of said balls are provided on opposing sides in the circumferential direction in an outer circumferential opening of each of the other cage pockets which has the inner circumferential guiding faces on the inner circumferential opening, and an interval between the pair of opposite outer circumferential stoppers becomes gradually narrow outwardly in the radial direction of the cage to stop come-off of the ball toward an outer circumferential side, said opposite outer circumferential stoppers having a surface facing the pocket and a surface opposite to the pocket in the circumferential direction both of which approach the pocket in the circumferential direction as the surface facing the pocket and the surface opposite to the pocket project outwardly in the radial direction from the curved segments, a surface facing the pocket in each of the opposite outer circumferential stoppers projects toward the pocket when the surface goes to a radial outer side, and a chamfered flat surface that is apart from a surface of the ball in the pocket is located on the radial outer side of the surface facing the pocket, wherein the outer circumferential guiding convexes and the outer circumferential stoppers which are adjacent each other in the circumferential direction protrude from an outer circumferential surface of the curved segments independently, wherein the inner circumferential guiding convexes and the inner circumferential stoppers which are adjacent each other in the circumferential direction protrude from an inner circumferential surface of the curved segments independently, wherein a length in the circumferential direction of the outer circumferential guiding convex is longer than that of the outer circumferential stopper, a maximum height in the radial direction from the outer circumferential surface of the curved segment of the outer circumferential guiding convex is higher than that of the outer circumferential stopper, and an axial length of the outer circumferential guiding convex is longer than that of the outer circumferential stopper, wherein a length in the circumferential direction of the inner circumferential guiding convex is longer than that of the inner circumferential stopper, a maximum height in the radial direction from the inner circumferential surface of the curved segment of the inner circumferential guiding convex is higher than that of the inner circumferential stopper, and an axial length of the inner circumferential guiding convex is longer than that of the inner circumferential stopper, and wherein a segment of the outer circumferential surface of the curved segment between the outer circumferential guiding convexes and the outer circumferential stoppers which are adjacent each other in the circumferential direction does not overlap a segment of the inner circumferential surface of the curved segment between the inner circumferential guiding convexes and the inner circumferential stoppers which are adjacent each other, in the circumferential direction of the cage.

9. A cage for a ball bearing according to claim 8, wherein a circumference of said cage is separated at one position such that a securing portion at one end of said cage and an engaging portion at another end of said cage are engageable and detachable with respect to each other.

10. A cage for a ball bearing according to claim 8, wherein said outer circumferential guiding face includes a planar face at a center part in an axial direction of said cage body and partial conical faces on both axial sides of said center part, and
wherein said inner circumferential guiding face includes a planar face at a center part in an axial direction of said cage body and partial conical faces on both axial sides of said center part.

11. A cage for a ball bearing according to claim 8, wherein each of the cage pockets for accommodating balls is a cylindrical through hole.

12. A ball bearing comprising the cage according to claim 8, further comprising a plurality of balls, an outer ring and an inner ring.

13. A cage for a ball bearing according to claim 8, wherein the outer circumferential guiding faces are only provided on said certain cage pockets and the inner circumferential guiding faces are only provided on said other cage pockets.

14. A cage for a ball bearing according to claim 10, wherein a slope narrowing the plurality of outer circumferential openings are provided on a plurality of edges of the outer circumferential openings on which the outer circumferential guiding faces are provided, adjacent to the outer circumferential guiding faces in the circumferential direction, in said plurality of cage pockets.

15. A cage for a ball bearing according to claim 1, wherein the pair of opposite outer circumferential stoppers are formed such that balls may be inserted therebetween.

16. A cage for a ball bearing according to claim 1, wherein the pair of opposite inner circumferential stoppers are formed such that balls may be inserted therebetween.

17. A cage for a ball bearing according to claim 1, wherein a thickness of the pair of inner circumferential guiding convexes, in the circumferential direction, increases as the pair of inner circumferential guiding convexes project radially inward.

18. A cage for a ball bearing according to claim 1, wherein a thickness of the pair of outer circumferential guiding convexes, in the circumferential direction, increases as the pair of outer circumferential guiding convexes project radially outward.

19. A cage for a ball bearing according to claim 1, wherein the outer circumferential guiding convex, except for a part of the outer circumferential guiding convex facing the pocket, is surrounded by the outer circumferential surface of the curved segment,
wherein the outer circumferential stopper, except for a part of the outer circumferential stopper facing the pocket, is surrounded by the outer circumferential surface of the curved segment, wherein the inner circumferential guiding convex, except for a part of the inner circumferential guiding convex facing the pocket, is surrounded by the inner circumferential surface of the curved segment, and wherein the inner circumferential stopper, except for a part of the inner circumferential stopper facing the pocket, is surrounded by the inner circumferential surface of the curved segment.

* * * * *